US008790478B2

(12) United States Patent
Chen et al.

(10) Patent No.: US 8,790,478 B2
(45) Date of Patent: Jul. 29, 2014

(54) TRANSFER PRINTING METHOD AND SYSTEM FOR PRINTING IMAGES ON A WORKPIECE WITH SUPERCRITICAL FLUID

(75) Inventors: Chien-Wei Chen, New Taipei (TW); Ching-Fu Hsu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 13/348,601

(22) Filed: Jan. 11, 2012

(65) Prior Publication Data

US 2012/0235328 A1 Sep. 20, 2012

(30) Foreign Application Priority Data

Mar. 16, 2011 (TW) ............................ 100108877 A

(51) Int. Cl.

| | |
|---|---|
| ***B29C 65/48*** | (2006.01) |
| ***B29C 47/78*** | (2006.01) |
| ***B29C 47/02*** | (2006.01) |
| ***B32B 37/04*** | (2006.01) |
| ***B32B 37/10*** | (2006.01) |
| ***B32B 38/14*** | (2006.01) |
| ***B41F 16/00*** | (2006.01) |
| *B29C 47/08* | (2006.01) |

(52) U.S. Cl.

CPC .................................... *B41F 16/008* (2013.01)
USPC ........... 156/245; 156/240; 156/277; 264/259; 264/480; 425/174.4; 425/470

(58) Field of Classification Search

USPC .................. 156/240, 245, 277; 264/480, 259; 425/470, 174.4
See application file for complete search history.

(56) References Cited

U.S. PATENT DOCUMENTS

| | | | | |
|---|---|---|---|---|
| 7,625,514 | B2 | 12/2009 | Yusa | |
| 7,736,558 | B2 | 6/2010 | Yusa | |
| 2002/0170577 | A1* | 11/2002 | Mizobata et al. | 134/30 |
| 2004/0146636 | A1* | 7/2004 | DeYoung et al. | 427/58 |
| 2004/0211755 | A1* | 10/2004 | Yusa et al. | 216/54 |
| 2005/0238967 | A1* | 10/2005 | Rogers et al. | 430/5 |
| 2005/0240004 | A1* | 10/2005 | Yusa et al. | 528/480 |
| 2006/0102591 | A1* | 5/2006 | Jacobson et al. | 216/83 |
| 2008/0066787 | A1* | 3/2008 | Saga | 134/42 |
| 2009/0095216 | A1* | 4/2009 | Sandhu et al. | 118/624 |
| 2010/0283069 | A1* | 11/2010 | Rogers et al. | 257/98 |

FOREIGN PATENT DOCUMENTS

| | | | |
|---|---|---|---|
| CN | 2562975 | Y | 7/2003 |
| CN | 100399514 | C | 7/2008 |
| CN | 100564431 | C | 12/2009 |

OTHER PUBLICATIONS

Office action mailed on Dec. 24, 2012 for the Taiwan application No. 100108877, filing date: Mar. 16, 2011, p. 1 line 11 and line 13-14, p. 2-6 and p. 7 line 1-16.

* cited by examiner

*Primary Examiner* — Sonya Mazumdar
(74) *Attorney, Agent, or Firm* — Winston Hsu; Scott Margo

(57) ABSTRACT

The present invention relates to a transfer printing method and a system using the method for printing images on a workpiece with supercritical fluid. The method includes disposing the workpiece inside the first mold and disposing a transfer film above the workpiece, closing the first mold with a second mold and injecting pressured gas, whose pressure is greater than a critical pressure, into the first mold and the second mold, ensuring a temperature of the pressured gas being greater than a critical temperature so as to convert into supercritical fluid, softening the transfer film with the supercritical fluid, transferring an adhesive layer, a print layer and a hardening layer of the transfer film onto the workpiece, and opening the first mold and the second mold to take out the workpiece.

5 Claims, 5 Drawing Sheets

TRANSFER PRINTING METHOD AND SYSTEM FOR PRINTING IMAGES ON A WORKPIECE WITH SUPERCRITICAL FLUID

BACKGROUND OF THE INVENTION

1. Field of the Invention

The present invention relates to a transfer printing method and a transfer printing system for printing images on a workpiece, and more particularly, to a transfer printing method and a transfer printing system for printing images on a workpiece with supercritical fluid.

2. Description of the Prior Art

With the rise of environmental protection awareness, the relevant regulations are getting stricter. In order to meet requirements of the environmental protection and the relevant regulations, surface decorating technology has been developed with a trend to free-spraying or using hydro-paint. For example, a conventional heat transfer printing method is used for transferring a decorating pattern on a plastic film onto a surface of product, so as to decorate the product. However, a temperature of the conventional heat transfer printing method needs to be raised over glass transition temperature (Tg) so as to soften the plastic film. In such a manner, it will cause power consumption and time wasting. In addition, it will be confined to plasticity of the plastic film. As a result, the product can not meet appearance requirement of an arc shape. Furthermore, if the product is made of thermoplastic material, the conventional transfer printing method will cause heat deformation during transferring process. Hence, design of a transfer printing method for satisfying environmental protection regulations and for design flexibility is an important issue of the product appearance design.

SUMMARY OF THE INVENTION

The present invention provides a transfer printing method for printing images on a workpiece with supercritical fluid for solving above drawbacks.

According to the claimed invention, a transfer printing method for printing images on a workpiece with supercritical fluid includes disposing the workpiece inside a first mold and disposing a transfer film above the workpiece; closing the first mold with a second mold and injecting pressured gas, whose pressure is greater than a critical pressure, into the first mold and the second mold; ensuring a temperature of the pressured gas being greater than a critical temperature so as to convert into supercritical fluid; softening the transfer film with the supercritical fluid; transferring an adhesive layer, a print layer and a hardening layer of the transfer film onto the workpiece; and opening the first mold and the second mold to take out the workpiece.

According to the claimed invention, the transfer printing method further includes discharging the pressure inside the first mold so as to paste the transfer film on the workpiece after softening the transfer film with the supercritical fluid.

According to the claimed invention, the transfer printing method further includes opening the first mold and the second mold to take out the workpiece after discharging the pressure inside the second mold.

According to the claimed invention, the transfer printing method further includes illuminating the printed workpiece with ultraviolet light so as to harden the hardening layer.

According to the claimed invention, the gas is carbon dioxide and the gas is pressured over 73.3 bar and heated over 32.1° C. so as to convert into the supercritical fluid.

According to the claimed invention, ensuring a temperature of the pressured gas being greater than a critical temperature so as to convert into supercritical fluid includes heating the pressured gas to increase the temperature of the pressured gas to be greater than the critical temperature so as to convert into the supercritical fluid.

According to the claimed invention, a transfer printing system for printing images on a workpiece with supercritical fluid includes a first mold for supporting a workpiece and a transfer film; a second mold for closing with the first mold; and at least one gas pressuring unit communicated with the first mold and the second mold for injecting pressured gas into the first mold and the second mold, pressure of the pressured gas being greater than a critical pressure; wherein the transfer film is softened with the supercritical fluid, so as to transfer an adhesive layer, a print layer and a hardening layer of the transfer film onto the workpiece when a temperature of the pressured gas is greater than a critical temperature so as to convert into the supercritical fluid.

According to the claimed invention, the gas pressuring unit is a gas pressuring recycling unit including at least one gas injection valve, at least one gas ejecting valve and a pressured gas recycler, and the pressured gas recycler is communicated with the gas injection valve and the gas ejecting valve, so as to inject the pressured gas into the first mold and the second mold via the gas injection valve and to eject the pressured gas from the first mold and the second mold via the ejecting valve.

According to the claimed invention, the gas pressuring unit is used for ejecting the pressured gas inside the first mold so as to paste the transfer film on the workpiece after softening the transfer film with the supercritical fluid.

According to the claimed invention, the transfer printing system further includes an ultraviolet light apparatus for illuminating the printed workpiece with ultraviolet light so as to harden the hardening layer.

According to the claimed invention, the gas is carbon dioxide and the gas is pressured over 73.3 bar and heated over 32.1° C. so as to convert into the supercritical fluid.

According to the claimed invention, the transfer printing system further includes a heater for heating the pressured gas to increase the temperature of the pressured gas to be greater than the critical temperature so as to convert into the supercritical fluid.

In summary, the present invention utilizes the supercritical fluid to soften the transfer film, so as to transfer patterns on the transfer film onto the workpiece. Since the transfer film can be softened without raising the temperature over the glass transition temperature, it can greatly reduce a temperature of transferring process and power consumption thereof. In the meanwhile, since the temperature does not need to be raised over the glass transition temperature, it saves time both for the heating process and cooling process, and thus it can avoid thermal deformation for the workpieces made of thermal plastic material as well. In addition, the present invention can effectively enhance the plasticity of the transfer film, so as to fit appearance requirement of the product. As a result, the present invention provides a design of a transfer printing method for satisfying environmental protection regulations and for design flexibility.

These and other objectives of the present invention will no doubt become obvious to those of ordinary skill in the art after reading the following detailed description of the embodiment that is illustrated in the various figures and drawings.

DETAILED DESCRIPTION

Figure 1:
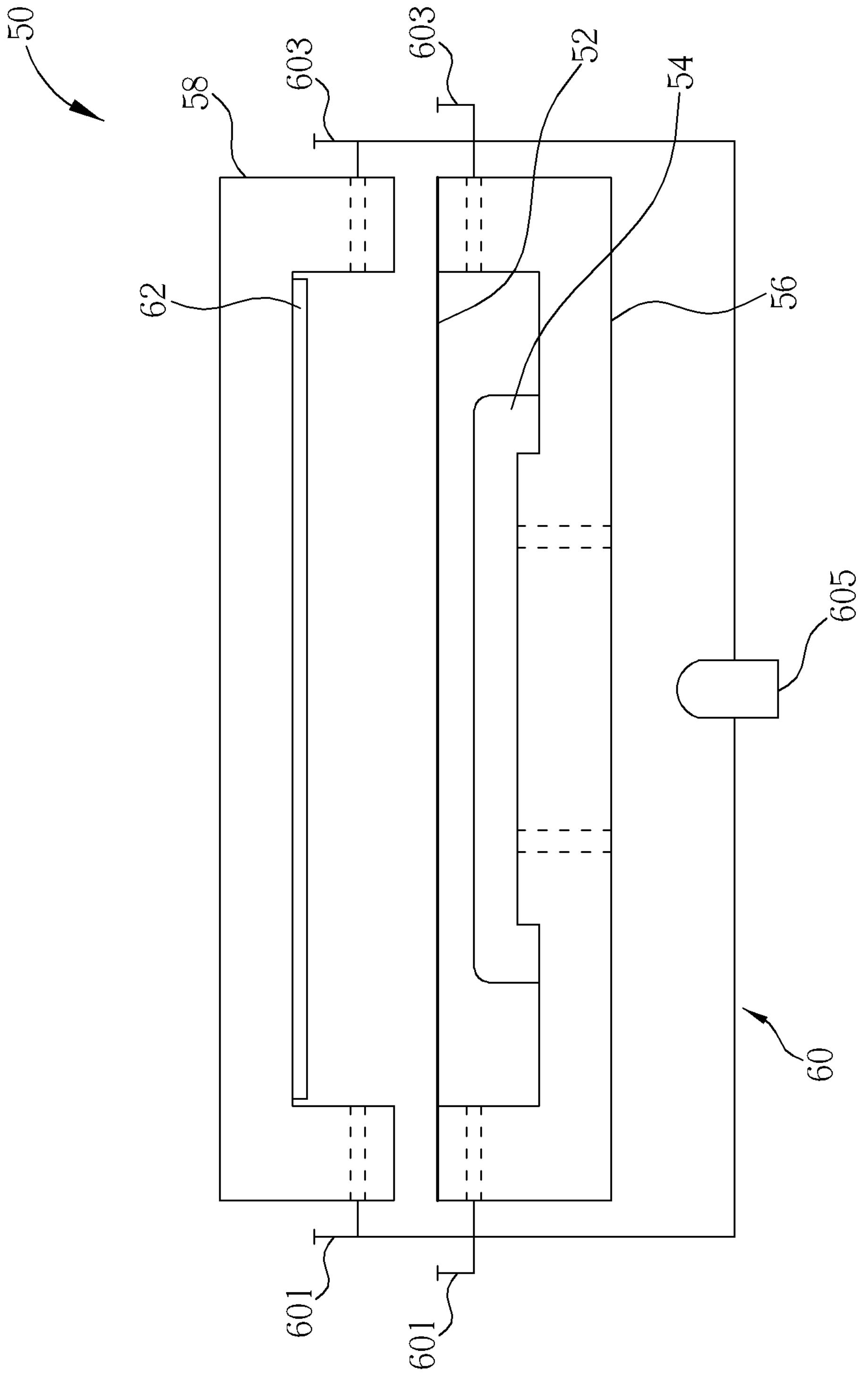
FIG. 1 to FIG. 3 are diagrams respectively illustrating a process of transferring a transfer film onto a workpiece by a transfer printing system according to an embodiment of the present invention.
Figure 2:
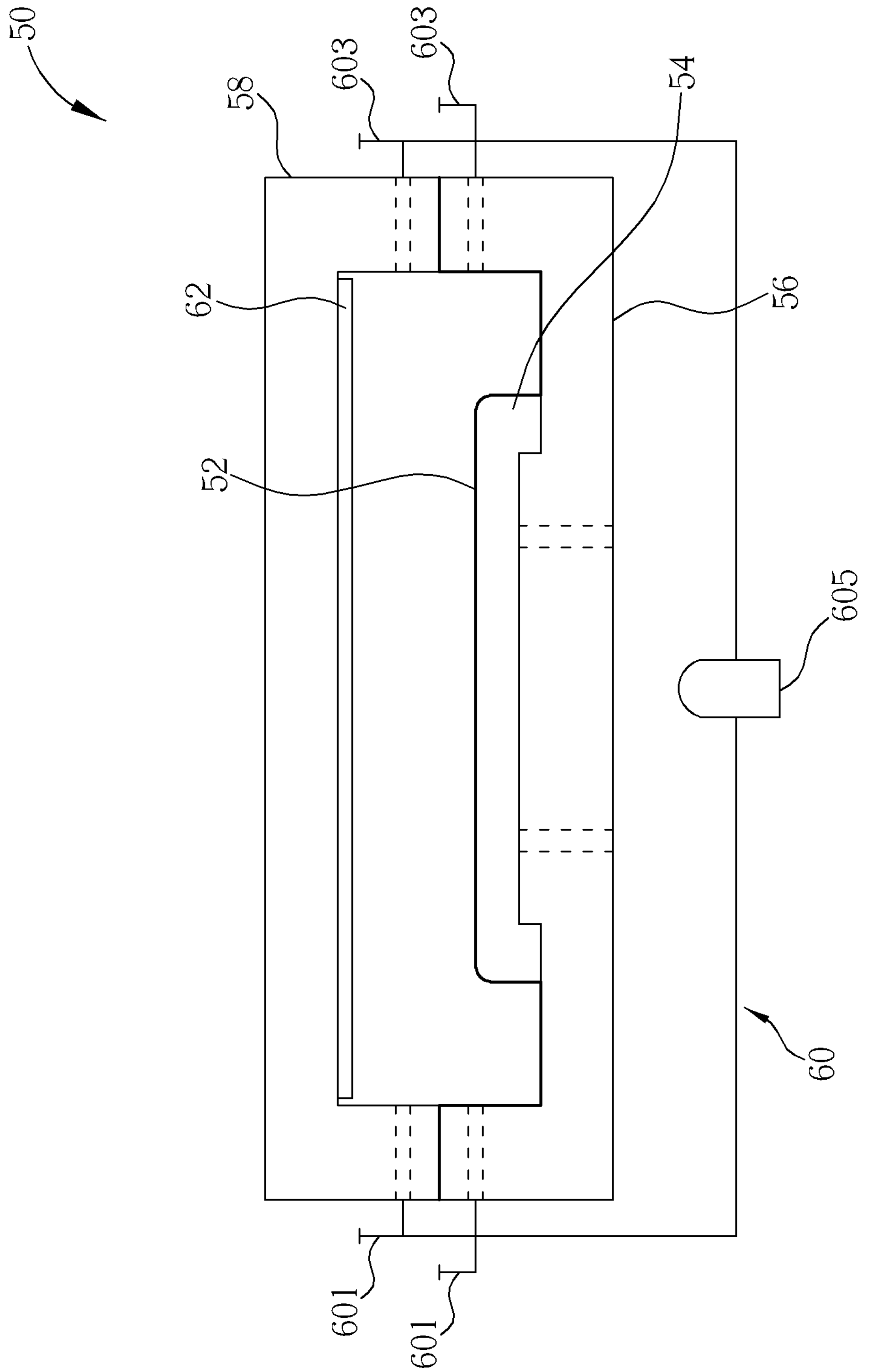
Figure 3:
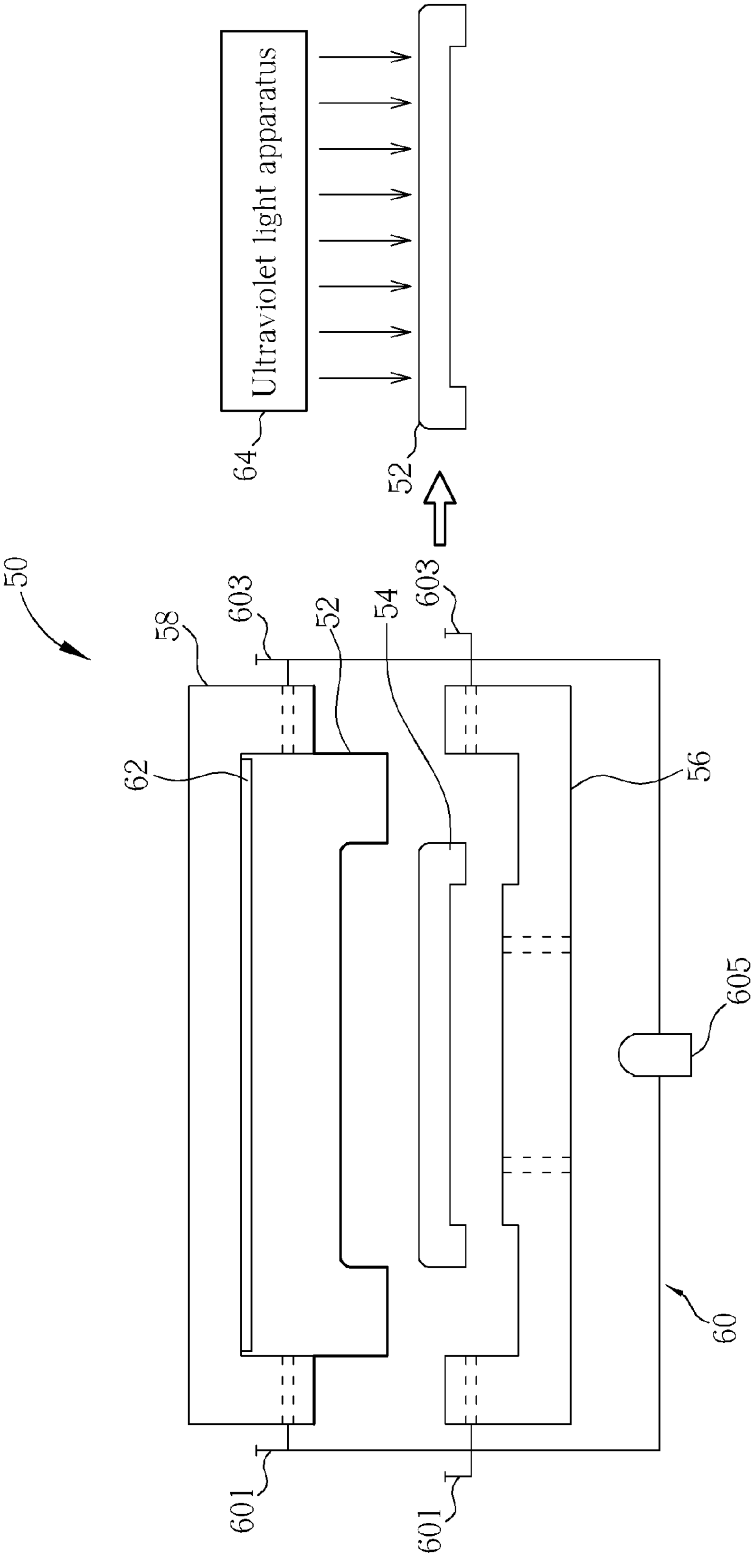
Figure 4:
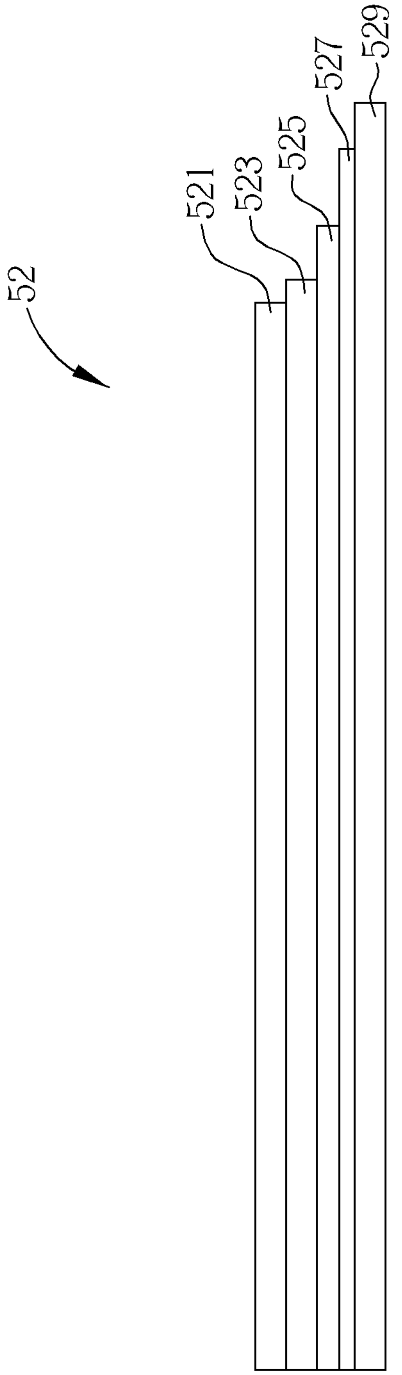
FIG. 4 is a structural diagram of the transfer film according to the embodiment of the present invention.

Please refer to FIG. 1 to FIG. 3. FIG. 1 to FIG. 3 are diagrams respectively illustrating a process of transferring a transfer film 52 onto a workpiece 54 by a transfer printing system 50 according to an embodiment of the present invention. The transfer printing system 50 can transfer the transfer film 52 with a decorating pattern onto a surface of the workpiece 54, so as to decorate the product. The decorating pattern can be disposed on a plastic film in a coating or a printing manner, so as to form the transfer film 52. For example, please refer to FIG. 4. FIG. 4 is a structural diagram of the transfer film 52 according to the embodiment of the present invention. The transfer film 52 can include an adhesive layer 521, a print layer 523, a hardening layer 525, a debonding layer 527 and a plastic substrate 529. The adhesive layer 521 is used for attaching the transfer film 52 onto the workpiece 54. The print layer 523 is used for decorating an appearance of the product. In other words, the print layer 523 can have colors, patterns and etc. thereon. The hardening layer 525 is used for providing the product with hardness of the appearance. The debonding layer 527 is used for separating the hardening layer 525 and the plastic substrate 529 which is used for supporting. In addition, the workpiece 54 can be a housing of the product, such as a housing of a notebook computer, and the workpiece 54 can be made of plastic material or other material.

The transfer printing system 50 includes a first mold 56, a second mold 58, at least one gas pressuring unit 60, a heater 62 and an ultraviolet light apparatus 64. The first mold 56 is used for supporting the workpiece 54 and the transfer film 52. The second mold 58 is used for closing with the first mold 56 so as to form a closed space in the interior therebetween. The gas pressuring unit 60 is used for injecting pressured gas into the first mold 56 and the second mold 58. For example, the gas pressuring unit 60 can be a gas pressuring recycling unit. In other words, the gas can be recycled within this closed loop. The gas pressuring unit 60 can include at least one gas injection valve 601, at least one gas ejecting valve 603 and a pressured gas recycler 605 which can be a pressure pump. The pressured gas recycler 605 is communicated with the gas injection valve 601 and the gas ejecting valve 603, so as to inject the pressured gas into the first mold 56 and the second mold 58 via the gas injection valve 601 and to eject the pressured gas out of the first mold 56 and the second mold 58 via the gas ejecting valve 603. If the first mold 56 and the second mold 58 are desired to use one single gas recycling mechanism commonly, the first mold 56 and the second mold 58 can share the same one gas pressuring unit 60. If the first mold 56 and the second mold 58 are desired to use different gas recycling mechanisms, two gas pressuring units 60 can be disposed for being communicated with the first mold 56 and the second mold 58, respectively. As for which one is selected, it depends on practical demands. Furthermore, the heater 62 is used for heating the pressured gas to increase the temperature of the pressured gas to be greater than the critical temperature so as to convert into the supercritical fluid.

A variety of gas, such as $CO_2$, $N_2O$, $SF_6$, $NH_3$, $H_2O$, n-$C_4H_{10}$, n-$C_5H_{12}$, Xe, $CCl_2F_2$, $CHF_3$ and so on, can convert into the supercritical fluid as the temperature and the pressure thereof are higher than a specific temperature (the critical temperature) and a specific pressure (the critical temperature). The supercritical fluid is characterized in both liquid and gas. For example, the low viscosity and the high diffusivity of the supercritical fluid are similar to the ones of gas, while the intensity thereof is similar to the one of liquid, and the supercritical fluid is capable of dissolving a solute as liquid. The supercritical fluid can permeate into the transfer film 52, so as to reduce complexity of bonding for the plastics. Accordingly, it can increase mobility of the plastic bonding, so as to decline the viscosity of the plastics. Consequently, the temperature for the transfer film 52 to be softened does not need to be raised over a glass transition temperature, so as to reduce the transferring temperature during the process and to reduce power consumption. In the meanwhile, since the temperature does not need to be raised over the glass transition temperature, it can save cooling time, so as to shorten manufacturing period. Take carbon dioxide for example, when the carbon dioxide is heated over 32.1° C. and pressured over 73.3 bar, it can convert into the supercritical fluid. Since properties change in which the intensity is similar to liquid, the viscosity is similar to gas, the diffusivity is 100 times bigger than that of liquid, the dissolving parameter can vary between 7-10, it has advantages of inertia, being nontoxic, non-inflammability, no erosion and so on. Consequently, the gas pressuring unit 60 is used for pressuring the carbon dioxide to make the pressure over the critical pressure (e.g. over 73.8 bar) of the carbon dioxide, and the heater 62 is used for heating the carbon dioxide to make the temperature over the critical temperature (e.g. 32.1° C.), so as to convert the carbon dioxide into the supercritical fluid. The ultraviolet light apparatus 64 is used for illuminating the printed workpiece 54 with ultraviolet light so as to harden the hardening layer 525 of the workpiece 54.

Figure 5:
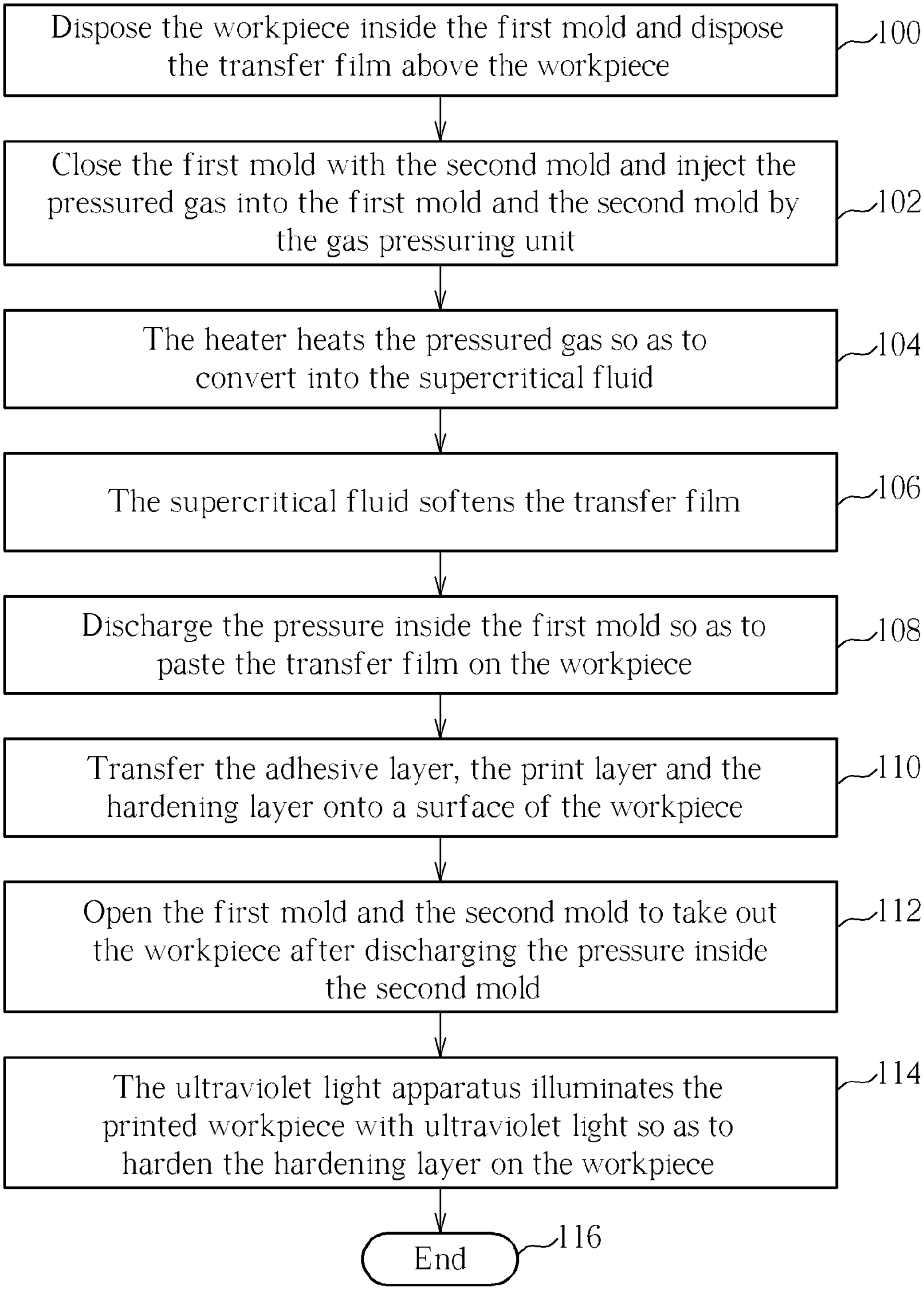
FIG. 5 is a flow chart illustrating that the transfer printing system transfers the transfer film onto the workpiece according to the embodiment of the present invention.

Please refer to FIG. 5. FIG. 5 is a flow chart illustrating that the transfer printing system 50 transfers the transfer film 52 onto the workpiece 54 according to the embodiment of the present invention. The printing method includes following steps:

Step 100: Dispose the workpiece 54 inside the first mold 56 and dispose the transfer film 52 above the workpiece 54.

Step 102: Close the first mold 56 with the second mold 58 and inject the pressured gas into the first mold 56 and the second mold 58 by the gas pressuring unit 60.

Step 104: The heater 62 heats the pressured gas so as to convert into the supercritical fluid.

Step 106: The supercritical fluid softens the transfer film 52.

Step 108: Discharge the pressure inside the first mold 56 so as to paste the transfer film 52 on the workpiece 54.

Step 110: Transfer the adhesive layer 521, the print layer 523 and the hardening layer 525 onto a surface of the workpiece 54.

Step 112: Open the first mold 56 and the second mold 58 to take out the workpiece 54 after discharging the pressure inside the second mold 58.

Step 114: The ultraviolet light apparatus 64 illuminates the printed workpiece 54 with ultraviolet light so as to harden the hardening layer 525 on the workpiece 54.

Step 116: End.

More detailed description for the above-mentioned steps will be provided as follows. As shown in FIG. 1, at first, the workpiece 54 can be disposed inside the first mold 56, and the transfer film 52 is disposed above the workpiece 54. In the meanwhile, there is still a space formed between the transfer film 52 and the workpiece 54. Then, as shown in FIG. 2, the first mold 56 is closed with the second mold 58, and the gas pressuring unit 60 is used for injecting pressured gas into the first mold 56 and the second mold 58. In other words, the pressured gas recycler 605 can inject the pressured gas into the first mold 56 and the second mold 58 via the gas injection valve 601. Take the carbon dioxide for example, the pressured gas recycler 605 can inject the carbon dioxide with the pressure greater than the critical pressure (e.g. 73.3 bar). Then, the heater 62 can heat the pressured gas, so as to convert the gas into the supercritical fluid. Take the carbon dioxide for example, the heater 62 can heat the pressured carbon dioxide so that the temperature of the carbon dioxide is greater than the critical temperature (e.g. 32.1° C.). In such a manner, the gas can convert into the supercritical fluid. In addition, if some specific gas, such as hydrogen whose critical temperature is −147° C. and critical pressure is 34 bar, is used, the transferring process can proceed without heating the gas because of normal temperature being greater than the critical temperature thereof. In other words, the heater 62 and the heating process can be omitted, and it depends on property of the chosen gas. Once the gas converts into the supercritical fluid, the gas can permeate into the transfer film 52, so as to reduce complexity of bonding for the plastics. Accordingly, it can increase mobility of the plastic bonding, so as to decline the viscosity of the plastics. Consequently, the temperature for the transfer film 52 to be softened does not need to be raised over the glass transition temperature, so as to reduce the transferring temperature during the process and to reduce power consumption. In the meanwhile, since the temperature does not need to be raised over the glass transition temperature, it does not require cooling procedure, so as to shorten manufacturing period.

Then, the gas ejecting valve 603 discharges the pressure inside the first mold 56 for generating a pressure drop between the first mold 56 and the second mold 58, so as to paste the transfer film 52 onto the workpiece 54, such as pasting the transfer film 52 onto the workpiece 54 in a vacuum manner. The debonding layer 527 is still left on the plastic substrate 529 without separating from the adhesive layer 521, the print layer 523 and the hardening layer 525 after the adhesive layer 521, the print layer 523 and the hardening layer 525 of the transfer film 52 are transferred onto the surface of the workpiece 54. The gas ejecting valve 603 can discharge the pressure inside the second mold 58, and then the first mold 56 and the second mold 58 are opened for taking out the workpiece 54. Furthermore, the plastic substrate 529 together with the debonding layer 527 can be separated from the surface of the workpiece 54. As a result, the adhesive layer 521, the print layer 523 and the hardening layer 525 are left on the surface of the workpiece 54, while the plastic substrate 529 and the debonding layer 527 are waste materials in this manufacturing process. In addition, structure of the transfer film 52 is not limited to those mentioned in the above-mentioned embodiment. For example, it can only include the adhesive layer 521, the print layer 523, the hardening layer 525 and the plastic substrate 529 without the debonding layer 527. Also, the plastic substrate 529 can be transferred onto the surface of the workpiece 54 as well. As for which structure is selected, it depends on practical demands. Finally, the ultraviolet light apparatus 64 is used for illuminating the printed workpiece 54 with ultraviolet light so as to harden the hardening layer 525 of the workpiece 54. Consequently, the appearance of the workpiece 54 can be hardened by the above-mentioned hardening process. In addition, the ultraviolet light apparatus 64 can be omitted. For example, if the hardening layer 525 is made of polyurethane material, the heating process for hardening is adopted. The hardening method depends on property of the material of the hardening layer 525.

Compared with the prior art, the present invention utilizes the supercritical fluid to soften the transfer film, so as to transfer patterns on the transfer film onto the workpiece. Since the transfer film can be softened without raising the temperature over the glass transition temperature, it can greatly reduce a temperature of transferring process and power consumption thereof. In the meanwhile, since the temperature does not need to be raised over the glass transition temperature, it saves time both for the heating process and cooling process, and thus it can avoid thermal deformation for the workpieces made of thermal plastic material as well. In addition, the present invention can effectively enhance the plasticity of the transfer film, so as to fit appearance requirement of the product. As a result, the present invention provides a design of a transfer printing method for satisfying environmental protection regulations and for design flexibility.

Those skilled in the art will readily observe that numerous modifications and alterations of the device and method may be made while retaining the teachings of the invention.

What is claimed is:

1. A transfer printing method for printing images on a workpiece with supercritical fluid, the transfer printing method comprising:

disposing the workpiece inside a first mold and disposing a transfer film above the workpiece;

closing the first mold with a second mold and injecting pressurized gas, whose pressure is greater than a critical pressure, into the first mold and the second mold;

ensuring a temperature of the pressurized gas being greater than a critical temperature so as to convert into supercritical fluid;

softening the transfer film with the supercritical fluid;

discharging the pressure inside the first mold for generating a pressure drop between the first mold and the second mold so as to paste the transfer film on the workpiece after softening the transfer film with the supercritical fluid;

transferring an adhesive layer, a print layer and a hardening layer of the transfer film onto the workpiece; and opening the first mold and the second mold to take out the workpiece.

2. The transfer printing method of claim 1, further comprising opening the first mold and the second mold to take out the workpiece after discharging the pressure inside the second mold.

3. The transfer printing method of claim 1, further comprising illuminating the printed workpiece with ultraviolet light so as to harden the hardening layer.

4. The transfer printing method of claim 1, wherein the gas is carbon dioxide and the gas is pressurized over 73.3 bar and heated over 32.1° C. so as to convert into the supercritical fluid.

5. The transfer printing method of claim 1, wherein ensuring a temperature of the pressurized gas being greater than a critical temperature so as to convert into supercritical fluid comprises heating the pressurized gas to increase the temperature of the pressurized gas to be greater than the critical temperature so as to convert into the supercritical fluid.

* * * * *